(12) United States Patent
Diez et al.

(10) Patent No.: US 6,414,437 B1
(45) Date of Patent: Jul. 2, 2002

(54) APPARATUS AND METHOD FOR CONTROLLING ILLUMINATION DEVICES OF VEHICLES

(75) Inventors: Werner Diez, Wolfschlugen; Christine Weber, Esslingen, both of (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/668,646

(22) Filed: Sep. 22, 2000

(30) Foreign Application Priority Data

Sep. 23, 1999 (DE) .......................... 199 45 546

(51) Int. Cl.[7] ................................. B60Q 7/00
(52) U.S. Cl. ....................... 315/77; 315/80; 315/224; 315/307; 307/10.8
(58) Field of Search ..................... 315/307, 76, 77, 315/80, 83, 224, 308; 307/10.8

(56) References Cited

U.S. PATENT DOCUMENTS 5,381,074 A * 1/1995 Rudzewicz et al. ........... 315/82
5,877,897 A * 3/1999 Schofield et al. ........... 359/604

* cited by examiner

Primary Examiner—Don Wong
Assistant Examiner—Thuy Vinh Tran
(74) Attorney, Agent, or Firm—Gudrun E. Huckett

(57) ABSTRACT

In a method for controlling illumination devices of motor vehicles, wherein the illumination devices are correlated with different functional areas of a light assembly and are supplied with current, the illumination devices are cycled with a rated current and the brightness level of the illumination devices are adjusted with a pulse width modulated signal. A device for performing the method has an electrical power source and illumination devices correlated with at least two functional areas and connected to the electrical power source. Actuating elements are provided for activating the illumination devices. At least one microprocessor is provided, wherein the actuating elements are connected to the at least one microprocessor, wherein the at least one microprocessor converts signals emitted by the actuating elements into pulse width modulated signals supplied to output terminals of the at least one microprocessor. Driver stages are connected to the output terminals of the at least one microprocessor and the illumination devices and configured to transmit the pulse width modulated signals to the illumination devices.

10 Claims, 4 Drawing Sheets

Example for Combination Possibilities of the Signal Functions

| | 1 | 2 | 3 | 30 |
|---|---|---|---|---|
| | Field 1 | Field 2 | Field 3 | Field 4 |

| Signal Combinations | Field 1 | Field 2 | Field 3 | Field 4 |
|---|---|---|---|---|
| SL | level 1 (SL) | level 1 (SL) | level 1 (SL) | level 1 (SL) |
| BR | level 2 (BR) | level 2 (BR) | level 2 (BR) | level 2 (BR) |
| SL + BR | level 2 (BR) | level 2 (BR) | level 2 (BR) | level 2 (BR) |
| SL + NSL | level 1 (SL) | level 1 (SL) | level 1 (SL) | level 3 (NSL) |
| SL + NSL + BR | level 3 (BR) | level 1 (SL) | level 1 (SL) | level 3 (NSL) |

Fig. 5

APPARATUS AND METHOD FOR CONTROLLING ILLUMINATION DEVICES OF VEHICLES

BACKGROUND OF THE INVENTION

1. Field of the Invention

The invention relates to a method for controlling illumination devices of vehicles, preferably motor vehicles, in which the illumination devices are correlated with different functional areas and are supplied with current. The invention also relates to a device for performing such a method, wherein the device comprises illumination devices correlated with at least two functional areas which are connected to an electrical power source and can be switched on by actuating elements.

2. Description of the Related Art

It is known in regard to tail light assemblies of a motor vehicle to assign various signaling functions to the illumination devices. The tail light assemblies, comprise generally a tail light, a brake light, a rear fog light, and a reverse drive light. It is known to use LEDs as illumination devices for these purposes. LEDs require low electrical current, for example, 20% of the rated current or less. In this range, the LEDs have great tolerances with respect to the forward voltage. This results in the LEDs being illuminated with different brightness, depending on the manufacturing tolerances.

SUMMARY OF THE INVENTION

It is an object of the present invention to develop the methods and the device of the aforementioned kind such that the brightness of the illumination devices can be adjusted in a directed manner.

In accordance with the present invention, this is achieved with respect to the method in that the illumination devices are cycled with the rated current and their brightness is adjusted by a pulse width modulated signal.

In accordance with the present invention, the object is achieved with respect to the device in that the actuating elements are connected to at least one microprocessor which converts the signals of the actuating elements into pulse width modulated signals which are supplied to the output terminals of the microprocessor and can be supplied via driver stages to the illumination devices.

Accordingly, the illumination devices are cycled with the rated current and their brightness is adjusted by pulse width modulation for compliance with the legal requirements. The illumination devices are advantageously LEDs but can also be incandescent light bulbs. The pulse width modulated signals are generated in the microprocessor and are supplied via the drivers stages to the respective illumination devices. The brightness change is realized by a pulse width modulated signal which is generated in the microprocessor by means of a corresponding program. In the case of LEDs being used as the illumination devices, they can be controlled with minimal current supply reliably such that the legally required brightness is provided for the each signal function, respectively.

BRIEF DESCRIPTION OF THE DRAWING

In the drawing:

FIG. 5 illustrates in a diagram examples for combination possibilities of different signal functions of a tail light assembly of a motor vehicle.

DESCRIPTION OF THE PREFERRED EMBODIMENTS

The disclosed circuit according to the invention is employed for controlling different signal functions of a tail light assembly of a motor vehicle. The circuit can also be used for controlling illumination devices in the interior of the vehicle, for example, the dashboard illumination, reading lamps and the like. It is important in this context that the signal functions are controlled so as to provide different brightness levels.

Figure 1:
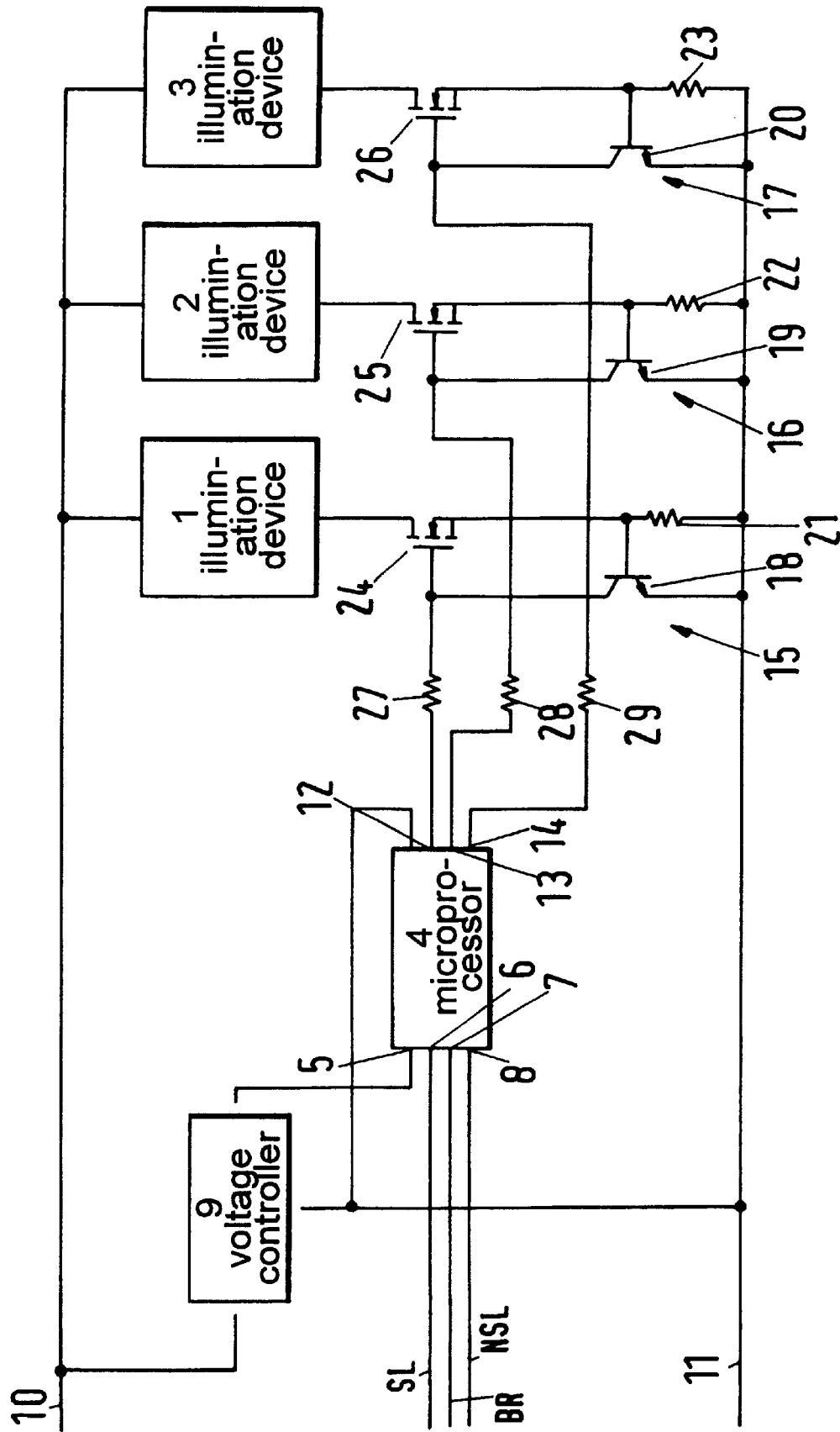
FIG. 1 shows a schematic circuit diagram of the device according to the invention for controlling illumination devices.

In the circuit according to. FIG. 1 three illumination devices 1 through 3 are controlled. These illumination devices in the simplest scenario are formed by three incandescent light bulbs. Advantageously, the illumination devices 1 to 3 are illumination fields or arrays which are formed by LEDs. The illumination device 1 can be, for example, a tail light; the illumination device 2 can be a brake light; and the illumination device 3 can be a rear fog light of the tail light assembly of a motor vehicle. A microprocessor 4 controls the brightness of the illumination devices 1 to 3 with a corresponding program as a function of the input signals 5 to 8. The microprocessor 4 is provided with a ROM memory and a corresponding program. The voltage controller 9 is positioned upstream of the microprocessors and controls the battery voltage 10 such that it is reduced from, for example, 12 volt to 5 volt. The voltage controller 9 is connected to ground 11. The voltage controller 9 provides the input signal 5 for the microprocessor 4. The analog input signals 6 to 8 for the illumination devices 1 to 3 are processed by the microprocessor 4 according to the program stored in its ROM memory and are supplied to the output terminals 12 to 14 of the microprocessor 4.

Downstream of the microprocessor 4 current limiter stages 15 to 17 are provided which limit the current flowing to the illumination devices 1 to 3. Preferably, they limit the current to a constant current strength. The current limiter stages 15 to 17 are identical, and they each have a transistor 18 to 20 as well as a resistor 21 to 23 connected parallel thereto.

For controlling each illumination device 1 to 3, a driver stage 24 to 26 is provided for each illumination device 1 to 3. Each driver stage 24 to 26 has an electronic switch, preferably a MOSFET (metal-oxide- silicon field effect transistor). Each output signal present at the output terminals 12 to 14 of the microprocessor 4 is supplied via the resistor 27 to 29 to the corresponding driver stage 24 to 26, respectively.

The illumination devices 1 to 3 are advantageously formed by LED fields. With respect to their particular function, these LED or signal fields (arrays) must comply with certain legal requirements in regard to light intensity, surface area size, and spacing of the individual functional fields from one another. Depending on the required signal combination, different illumination variants will result. Also, the signal fields 1 to 3 can be provided with several signal functions. Accordingly, the signal fields 1 to 3 must have different brightness levels as a function of the required signal combination. In FIG. 5 combination possibilities for four signal fields 1 to 3 and 30 are provided as an example. These signal fields are formed by LED arrays and are provided within the tail light assembly of a motor vehicle. As illustrated schematically in FIG. 5, the signal fields 1 to 3, 30 can be positioned directly adjacent to one another so that the individual signal fields of the tail light assembly, when the tail light assembly is not switched on, do bot give the appearance of separate fields. In the exemplary situation it is assumed that the tail light assembly should provide the functions of a taillight SL, a brake light BR, and a rear fog light NSL.

Once the driver has switched on the vehicle lights, the tail light SL of the tail light assembly is illuminated. In the illustrated embodiment according to FIG. 5, all four signal fields 1 to 3, 30 are illuminated with identical brightness. In this case a minimal brightness of individual signal fields 1 to 3, 30 is sufficient. Accordingly, the LEDs of these signal fields are maintained at the level 1.

When the driver has not yet switched on the lights of the vehicle and activates the brake, the brake light BR is illuminated within the tail light assembly. In the embodiment according to FIG. 5, in this case all four signal fields 1 to 3, 30 are supplied with current so that they are illuminated at the same time. Since it is required of the brake light BR that it is illuminated with a certain minimum brightness, it is assumed that the brightness of the signal fields 1 to 3, 30 in this embodiment is at the level 2.

FIG. 5 shows a further scenario in which the tail light assembly of the motor vehicle has been switched on and the brake has been actuated. When the brake is not actuated, the signal fields 1 to 3, 30 are illuminated at the level 1. As soon as additionally the brake pedal is suppressed,.the brightness of the fields 1 to 3, 30 is raised to the level 2, i.e., the illumination strength is increased so that the brightness values which are required of the brake light are generated.

When, with the tail light assembly being switched on, the rear fog light is switched on by the driver, the brightness of the signal field 30 is increased very strongly to the level 3 in this situation. Accordingly, the signal field 30 functions as a rear fog light. The signal fields 1 to 3 remain with respect to their brightness on the level 1 so that these three signal fields provide the function of the tail light.

Finally, FIG. 5 illustrates the scenario in which the tail light SL and the rear fog light NSL are switched on and the brake pedal is actuated so that the brake light BR is also illuminated. In this case, the brightness of the signal field 1 is increased to the level 3 so that this signal field 1 fulfills the function of the brake light. The brightness of the signal fields 2 and 3 remains at the level I so that these signal fields function as the tail light SL. The signal field 30 serves as a rear fog light NSL and has therefore a high brightness of the level 3.

These examples illustrate that the individual signal functions of the tail light assembly of a motor vehicle can be fulfilled properly with regard to legal requirements by means of different brightness of the signal fields 1 to 3, 30.

The brightness changes are achieved by a pulse width modulated signal that is generated by the program stored in the microprocessor 4. In order for onboard voltage fluctuations not to have an effect on the maximum current level in the current path to the illumination fields 1 to 3, 30, the current on this path is limited by the afore described current limiter stages 15 to 17. The LEDs of the signal fields 1 to 3, 30 are cycled with rated current while the brightness is controlled by the pulse pause ratio.

Figure 3:
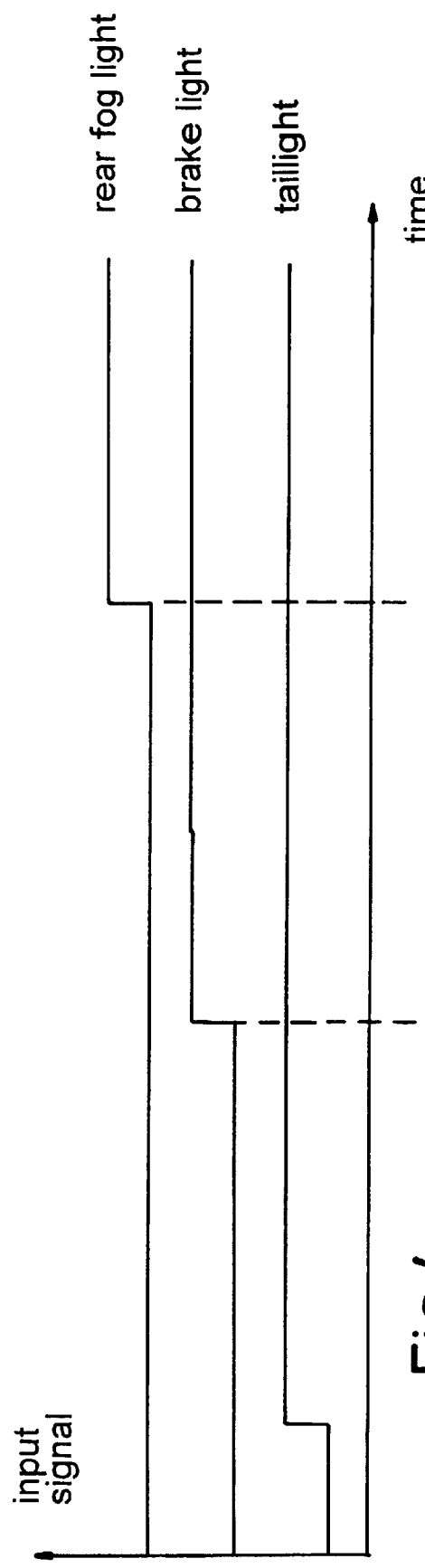
FIG. 3 shows the input signal for different illumination devices as a function of time.

FIG. 3 shows the dependency of the input signal as a function of the time for the rear fog light NSL, the brake light BR, and the tail light SL. It can be seen that the smallest input signal is provided for the tail light SL. Higher input signals are provided for the brake light BR and the rear fog light NSL wherein the input signal for the rear fog light NSL is higher than that for the brake light BR. In FIG. 3, a situation is illustrated in which the tail light is switched on first. Subsequently, the brake pedal is actuated so that the brake light will be illuminated. Subsequently, the rear fog light NSL is also switched on. As soon as the corresponding functions have been activated, the corresponding input signal is accordingly increased.

Figure 4:
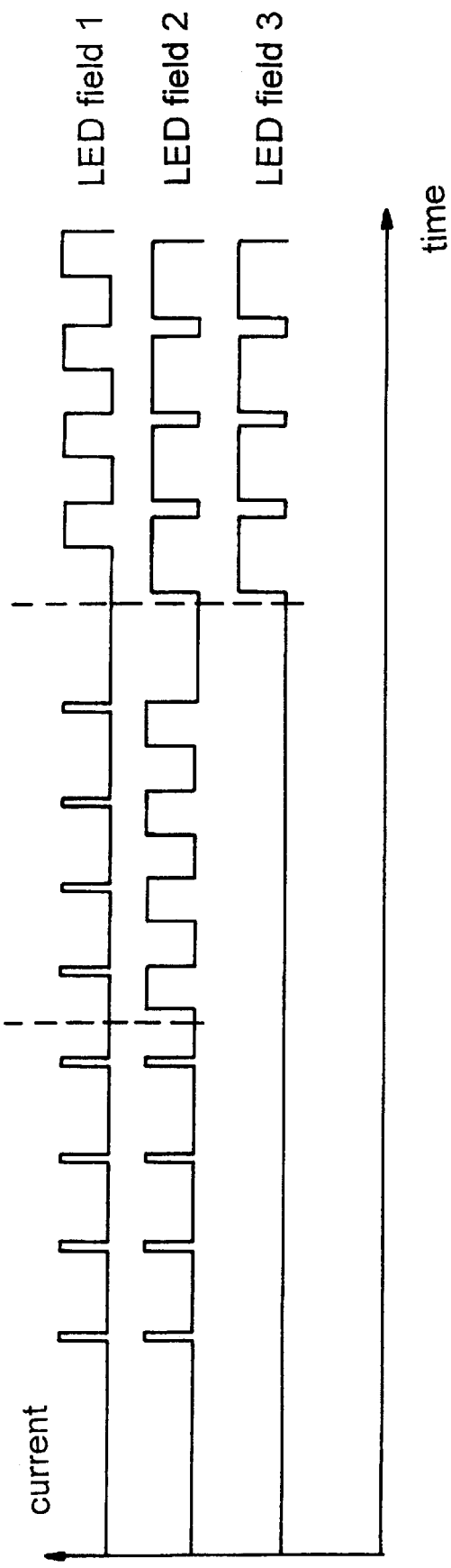
FIG. 4 shows the current for different illumination devices as a function of time.

FIG. 4 shows in an exemplary fashion for the three signal fields 1 to 3 the corresponding cycled currents as well as the provided pulse width modulated signals for adjustment of the required brightness. As can be seen in FIG. 1, the signal field 1 provides the tail light function SL, the signal field 2 provides the brake light function BR, and the signal field 3 provides the rear fog light function NSL. When only the tail light SL is switched on, the brightness of the corresponding LEDs can be relatively low. As illustrated in connection with FIG. 5, in this case all signal fields are actuated with the same low brightness. As soon as the brake pedal is actuated and accordingly the brake light BR is switched on, a corresponding change of the pulse width modulated signal causes the signal field corresponding to the brake light function to be illuminated at a respectively high illumination level.

At the moment when the rear fog light NSL is switched on, i.e., the tail light, the rear fog light, and the brake light are illuminated at the same time, the pulse width ratio of the LEDs corresponding to the tail light SL and the brake light BR is increased. In the illustrated embodiment the signal field 3 correlated with the rear fog light NSL has the same pulse pause ratio as the signal field 2 correlated with the brake light BR. The signal field 1 which is correlated with the tail light SL has a smaller pulse pause ratio than the signal fields 2 and 3.

The program which is saved in the microprocessor 4 can generate the corresponding pulse pause ratios, respectively, the pulse width modulated signals for the individual signal fields depending on the respectively required signal function of the tail light assembly.

Via the connectors 6 to 8, the microprocessor 4 receives the corresponding signals when the tail light SL and the rear fog light NSL are switched on and the brake pedal is actuated. At the output terminals 12 to 14 the output signals processed by the microprocessor 4 are then present with which the corresponding signal fields 1 to 3, 30 are controlled.

The requirements demanded by law of tail light assemblies of motor vehicles with regard to light strength, surface area size, and the spacing of the individual functional areas are fulfilled properly. Depending on the required signal combination, different illumination variants result, as has been explained with the aid of FIG. 5. The signal fields 1 to 3, 30 can have several signal functions assigned to them. As is illustrated in an exemplary fashion in FIG. 5, the signal field 1 is used as a tail light SL and a brake light BR. The same holds true also for the signal fields 2 and 3. Depending on the signal combination, the signal field 3 has the function of the tail light SL, brake light BR, and rear fog light NSL. In this connection, the signal fields, depending on the respective signal combination, are controlled to have different brightness levels. The spatial division of the individual light signal functions is variable as a function of the respective signal combination. This provides a high degree of freedom with respect to design without this having disadvantageous effects in regard to fulfilling the legal requirements. According to the embodiment represented in FIG. 5, the spacing between the brake light BR and the rear fog light NSL can be easily 100 mm, as required by law. In order to produce low brightness levels, the LEDs of the signal fields 1-3, 30 are supplied only with a minimal current, which is approximately 20% of the rated current or smaller. In this current range, the LEDs, in general, have strength tolerances in the forward voltage so that the LEDs in this range will illuminate at different levels, and this would cause the respective functional field to be illuminated non-uniformly. However, since, according to the invention, the LEDs are cycled with the rated current and the brightness is controlled by the pulse pause ratio, this inherent property of LEDs at minimal current level has no disadvantageous effect.

Figure 2:
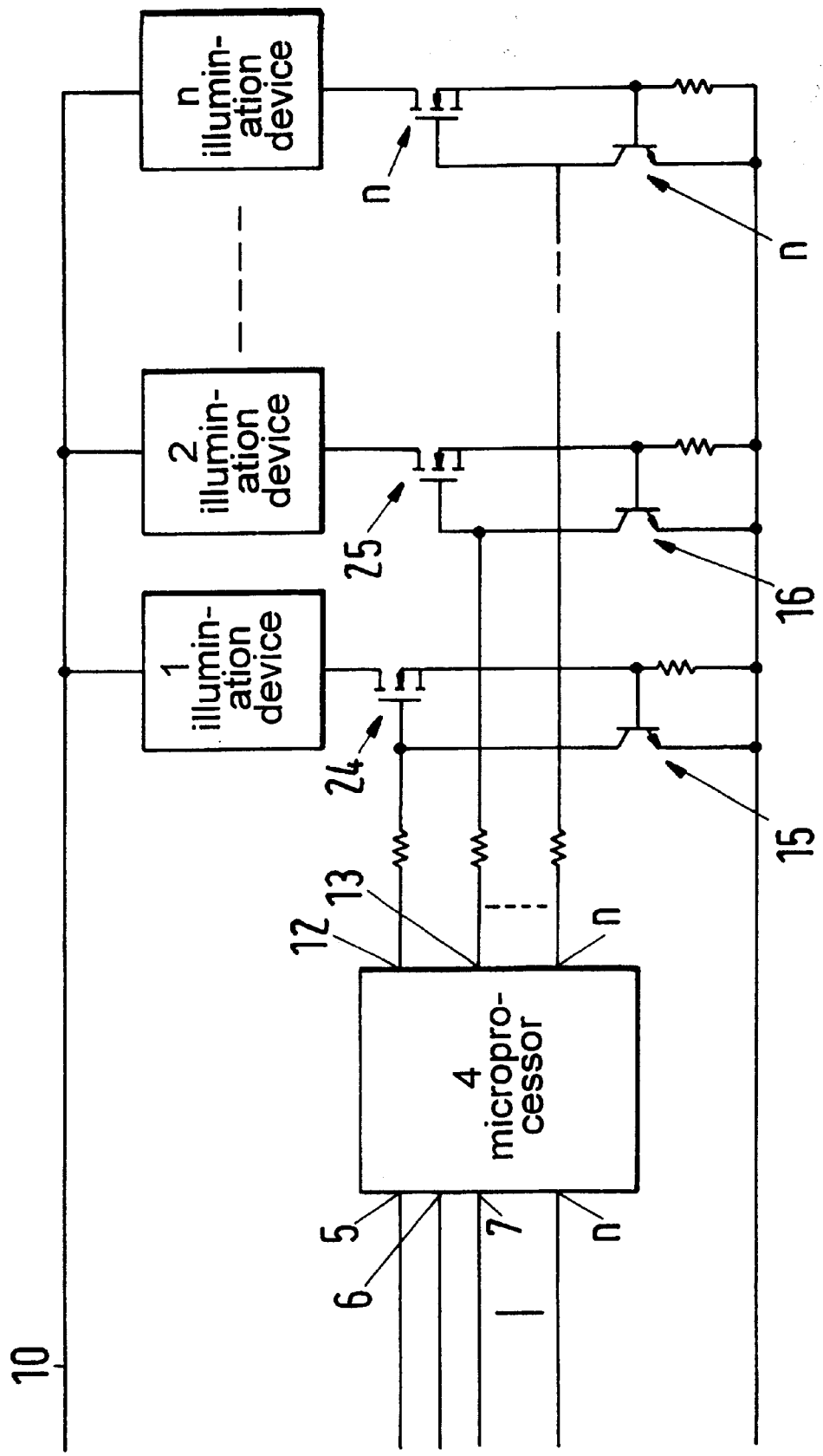
FIG. 2 shows the circuit diagram according to FIG. 1 in a general representation.

Of course, the reverse drive light of the tail light assembly can also be introduced into the functional range of this device. As illustrated in FIG. 2, the number of signal fields can be 1 to n, depending on the number of the desired signal functions. The microprocessor 4 in this case comprises a corresponding number of input terminals 5 to n and output terminals 12 to n. The battery voltage 10 is conventionally 12 volt and is reduced by the voltage controller 9 (FIG. 1) to the level which is required for operating the microprocessor. The signal fields 1 to n have correlated therewith the current limiter stages 15 to n and the driver stages 24 to n.

As a function of the analog input signals, which are present at the input terminals 5 to n of the microprocessor 4, the brightness of the signal field 1 to n that is to be controlled is adjusted as has been illustrated in an exemplary fashion with the aid of FIG. 5.

Instead of the LEDs each signal field can also be formed by at least one incandescent light bulb which is controlled in the same way as the LEDs. In this connection, it is also possible to provide each signal field with several incandescent light bulbs instead of just one.

The described signal fields 1 to 3, 30 must not be spatially separated areas within the tail light assembly. For example, the LEDs correlated with the signal fields can be arranged on a common circuit board wherein the LEDs required for a certain signal function are controlled in the described manner. The tail light assembly is provided, as is known in the art, with a light disc which is colored according to the required functional areas. The LEDs on the printed circuit board are arranged behind the light disc such that the corresponding light disc areas are illuminated during operation of the vehicle.

While specific embodiments of the invention have been shown and described in detail to illustrate the inventive principles, it will be understood that the invention may be embodied otherwise without departing from such principles.

What is claimed is:

1. A device for controlling illumination devices of motor vehicles, wherein said illumination devices are cycled with a rated current and a brightness level of said illumination devices is adjusted with a pulse width modulated signal; said device comprising:

an electrical power source;

illumination devices correlated with at least two functional areas and connected to said electrical power source;

actuating elements configured to activate said illumination devices;

at least one microprocessor (4), wherein said actuating elements are connected to said at least one microprocessor (4), wherein said at least one microprocessor (4) is configured to convert signals emitted by said actuating elements into pulse width modulated signals supplied to output terminals (12 . . . n) of said at least one microprocessor (4);

driver stages (24 . . . n) connected to said output terminals of said at least one microprocessor (4) and to said illumination devices and configured to transmit said pulse with modulated signals to said illumination devices;

a current limiter stage (15 . . . n) for each one of said driver stages (24 . . . n).

2. The device according to claim 1, comprising a voltage controller (9) connected to said at least one microprocessor (4).

3. The device according to claim 1, wherein each one of said driver stages (24 . . . n) comprises and electeronic switch.

4. The device according to claim 3, wherein said electronic switch is a MOSFET.

5. The device according to claim 1, wherein said current limiter stage (15 . . . n) has a transistor (18–20) and a resistor (21–23) connected in parallel to said transistor (18–20).

6. The device according to claim 1, wherein said illumination devices are combined to form signal fields (1–3, 30).

7. The device according to claim 6, wherein each one of said signal fields (1–3, 30) has one of said driver stages (24 . . . n) and one of said current limiters (15 . . . n) connected thereto.

8. The device according to claim 1, wherein said illumination devices are LEDs.

9. The device according to claim 1, wherein said illumination devices are incandescent light bulbs.

10. The device according to claim 1, forming a tail light assembly.

* * * * *